(12) United States Patent
Moldoveanu

(10) Patent No.: US 8,559,264 B2
(45) Date of Patent: Oct. 15, 2013

(54) METHOD TO ACQUIRE SIMULTANEOUSLY SEISMIC DATA WITH SOURCE ARRAYS DESIGNED FOR SPECIFIC TARGETS

(75) Inventor: Nicolae Moldoveanu, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 173 days.

(21) Appl. No.: 13/083,068

(22) Filed: Apr. 8, 2011

(65) Prior Publication Data

US 2011/0211422 A1 Sep. 1, 2011

Related U.S. Application Data

(62) Division of application No. 11/569,255, filed on Nov. 17, 2006, now Pat. No. 7,948,825.

(30) Foreign Application Priority Data

Jun. 17, 2004 (WO) .................. PCT/US2004/19184

(51) Int. Cl.
*G01V 1/38* (2006.01)

(52) U.S. Cl.
USPC .............................. 367/15; 367/153; 181/118

(58) Field of Classification Search
USPC .............................. 367/153, 144, 15; 181/118
See application file for complete search history.

(56) References Cited

U.S. PATENT DOCUMENTS

| | | |
|---|---|---|
| 4,493,061 A | 1/1985 | Ray |
| 4,721,180 A * | 1/1988 | Haughland et al. ........... 181/111 |
| 4,739,858 A | 4/1988 | Dragoset, Jr. |
| RE32,683 E | 5/1988 | Ray |
| 4,868,794 A | 9/1989 | Ziolkowski et al. |
| 4,956,822 A * | 9/1990 | Barber et al. .................... 367/23 |
| 4,992,990 A | 2/1991 | Langeland et al. |
| 5,142,498 A | 8/1992 | Duren |
| 5,281,773 A | 1/1994 | Duren |
| 5,924,049 A | 7/1999 | Beasley et al. |

(Continued)

FOREIGN PATENT DOCUMENTS

| | | |
|---|---|---|
| AU | 2004319619 A1 | 11/2005 |
| GB | 2141824 A | 1/1985 |

(Continued)

OTHER PUBLICATIONS

International Search Report of PCT Application No. PCT/US2004/019184 dated Dec. 23, 2004.

(Continued)

*Primary Examiner* — Mark Hellner

(57) ABSTRACT

A method for acquiring seismic data. The method may include towing one or more seismic streamers in the water, towing a first air gun array and a second air gun array in the water at a first depth, and towing a third air gun array and a fourth air gun array in the water at a second depth greater than the first depth. While towing the air gun arrays, the first and second air gun arrays and the third and fourth air gun arrays may be separated by a cross line distance that depends on a separation between the seismic streamers. The method may also include firing seismic energy, by the first, second, third and fourth air gun arrays, through the water into the earth. After firing the seismic energy, the method may record seismic signals reflected from strata in the earth beneath the water.

17 Claims, 7 Drawing Sheets

(56) References Cited

U.S. PATENT DOCUMENTS

| | | |
|---|---|---|
| 5,995,452 A | 11/1999 | Bouyoucus |
| 6,044,038 A * | 3/2000 | Allensworth .................. 367/16 |
| 6,493,636 B1 | 12/2002 | DeKok |
| 6,671,223 B2 | 12/2003 | Bittleston |
| 6,961,284 B2 * | 11/2005 | Moldoveanu ................ 367/154 |
| 7,577,060 B2 | 8/2009 | Toennessen et al. |
| 7,948,825 B2 | 5/2011 | Moldoveanu |
| 2008/0011540 A1 | 1/2008 | Moldoveanu et al. |

FOREIGN PATENT DOCUMENTS

| | | |
|---|---|---|
| GB | 2342081 A | 5/2000 |
| WO | 0116621 A1 | 3/2001 |
| WO | 2005111656 A1 | 11/2005 |

OTHER PUBLICATIONS

Examination Report of British Application Serial No. 0623924.8 dated May 18, 2007.

* cited by examiner

METHOD TO ACQUIRE SIMULTANEOUSLY SEISMIC DATA WITH SOURCE ARRAYS DESIGNED FOR SPECIFIC TARGETS

CROSS-REFERENCE TO RELATED APPLICATIONS

This application is a divisional of U.S. patent application Ser. No. 11/569,255, having a 35 USC 371(c) filing date of filed Nov. 17, 2006, and now U.S. Pat. No. 7,948,825, which is the U.S. National Stage of International Application PCT/US2004/019184, filed Jun. 17, 2004, which is incorporated herein by reference. PCT/US2004/019184 further claims the benefit of and priority to U.S. Provisional Patent Application Serial No. 60/567,895, filed May 4, 2004, the benefit of and priority to which is also claimed by this application.

BACKGROUND

1. Field of the Invention

Implementations of various technologies described herein generally relate to marine seismic surveying, and more preferably, to methods for acquiring seismic data.

2. Description of the Related Art

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Seismic exploration is widely used to locate and/or survey subterranean geological formations for hydrocarbon deposits. Since many commercially valuable hydrocarbon deposits are located beneath bodies of water, various types of marine seismic surveys have been developed. In a typical marine seismic survey, seismic streamers are towed behind a survey vessel. The seismic streamers may be several thousand meters long and contain a large number of sensors, such as hydrophones, geophones, and associated electronic equipment, which are distributed along the length of the each seismic streamer cable. The survey vessel also includes one or more seismic sources, such as air guns and the like.

As the seismic streamers are towed behind the survey vessel, acoustic signals, commonly referred to as "shots," produced by the one or more seismic sources are directed down through the water into strata beneath the water bottom, where they are reflected from the various subterranean geological formations. Reflected signals are received by the sensors, digitized, and then transmitted to the survey vessel. The digitized signals are referred to as "traces" and are recorded and at least partially processed by a signal processing unit deployed on the survey vessel. The ultimate aim of this process is to build up a representation of the subterranean geological formations beneath the streamers. Analysis of the representation may indicate probable locations of hydrocarbon deposits in the subterranean geological formations.

Many of the subterranean geological formations are better represented with low frequency seismic signals. Accordingly, a need exists in the art for one or more methods for acquiring seismic signals from subterranean geological formations that are better represented with low frequency seismic signals.

SUMMARY

One or more implementations of various technologies described herein are directed to a method for acquiring seismic data. In one implementation, the method may include towing one or more seismic streamers in the water, towing a first air gun array and a second air gun array in the water at a first depth, and towing a third air gun array and a fourth air gun array in the water at a second depth greater than the first depth. While towing the air gun arrays, the first and second air gun arrays and the third and fourth air gun arrays may be separated by a cross line distance that depends on a separation between the seismic streamers. The method may also include firing seismic energy, by the first, second, third and fourth air gun arrays, through the water into the earth. After firing the seismic energy, the method may record seismic signals reflected from strata in the earth beneath the water.

In another implementation, the method may include towing three or more seismic streamers in the water at three or more first depths, wherein each seismic streamer comprises a plurality of hydrophones disposed therealong; towing three or more air gun arrays in the water at three or more second depths; firing seismic energy, by the air gun arrays, through the water into the earth; and recording through the hydrophones seismic signals reflected from strata in the earth beneath the water.

One or more implementations of various technologies described herein are also directed to a marine surveying arrangement. The marine surveying arrangement may include one or more streamers having a separation therebetween, a first vessel and a second vessel. The first vessel may deploy a first air gun array and a second air gun array separated by a cross line distance defined by the separation between the streamers. The second vessel may deploy a third gun array and a fourth air gun array separated by the cross line distance. The first and second air gun arrays may be tuned to a leading peak, while the third and fourth air gun arrays may be tuned to a first bubble oscillation. Further, each one of the third and fourth air gun arrays may have a total volume greater than the total volume of each one of the first and second air gun arrays.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

Figure 1:
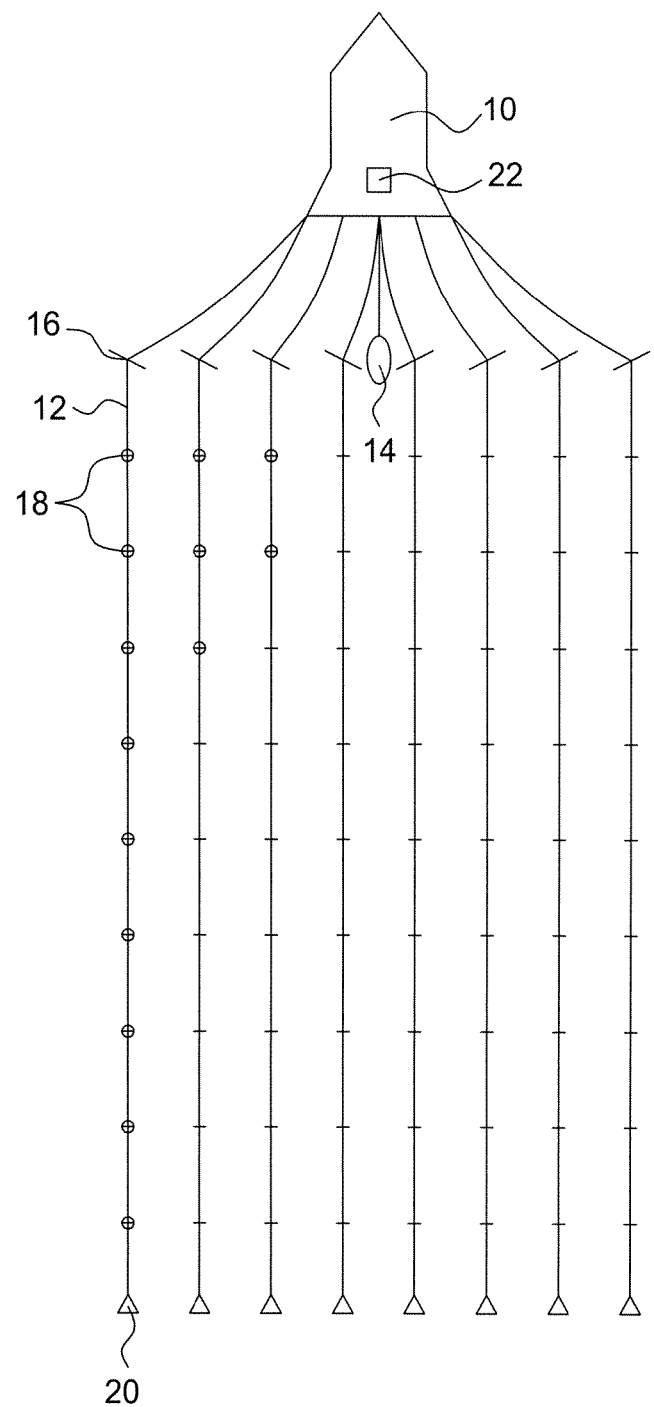
FIG. 1 illustrates a seismic survey vessel that may be used to acquire seismic data in accordance with one implementation of various technologies described herein.

FIG. 1 illustrates a seismic survey vessel 10 that may be used to acquire seismic data in accordance with one implementation of various technologies described herein. The seismic survey vessel 10 is shown towing an array of air guns 14. The seismic survey vessel 10 is also shown towing an array of eight seismic streamers 12. Each streamer 12 may be 6000 meters in length. The outermost streamers 12 in the array could be 700 meters apart, resulting in a horizontal separation of 100 meters between each streamer.

The air gun array 14 is comprised of air guns of varying sizes. The total volume of the air gun array 14 is 6000 cubic inches or greater. In one implementation, the total volume of the air gun array 14 is in a range between 6780 to 10,170 cubic inches. In another implementation, the total volume of the air gun array 14 is 8475 cubic inches. Air gun arrays with larger volumes generally allow greater penetration beneath the salt region. The air gun array 14 used in connection with various implementations described herein may include various types of air guns, such as Bolt LL guns, GI injector guns and the like. Although various implementations are described with reference to air guns, other types of emitters, such as marine vibrator units, are also contemplated by various technologies described herein.

The air gun array 14 may also be tuned to the first bubble oscillation. Tuning the air gun array 14 to the first bubble oscillation includes staggering the firing of each air gun within the array so that the first bubble oscillations generated by the air guns coincide, thereby emitting a source signature having high amplitudes at low frequencies. The period of the bubble emitted from each air gun depends on the volume of that air gun. For instance, air guns with small volumes emit bubbles with short periods. Accordingly, by appropriately staggering the firing of each air gun with a delay, the first bubble oscillations from all of the air guns within the air gun array 14 can be coordinated to occur at the same time. The air guns may be fired with delays that increase with decreasing air gun volume. The firings of the air guns may be staggered according to various techniques from commonly assigned U.S. Pat. No. 4,739,858, issued to Dragoset, Jr., which is incorporated herein by reference. In another implementation, the air gun array 14 may be tuned to the leading peak. As such, the air guns are fired simultaneously to enhance the primary pulse and to minimize the bubble reverberation by destructive interference, thereby producing a seismic source signal having high amplitudes at high frequencies.

As a result of tuning the air gun array 14 to the first bubble oscillation, the source signature of the air gun array 14 may contain a mixed phase spectrum, which necessitates deterministic deconvolution to shape the source signature during processing. Deterministic deconvolution, however, may require the source signature of the air gun array 14 to be determined. The source signature of the air gun array 14 may be determined by first positioning a set of hydrophones adjacent the air guns but spaced therefrom by a distance such that none of the hydrophones penetrates the air bubbles produced by the air guns. Then, the emitted pressure wave in the near field of the air gun array at n independent points whose positions are known with respect to the air gun array is measured. The measurements are then processed by taking into account the interactions between the air guns to construct at least notionally an equivalent array of n non-interacting independent sources having n equivalent signatures which are superposable to provide the source signature of the air gun array 14. The source signature of the air gun array 14 is then determined by superposing the n equivalent signatures. In one implementation, the source signature of the air gun array is the far field source signature of the air gun array. The above referenced process may be described in further detail in U.S. Pat. No. 4,868,794 issued to Ziolkowski et al., which is incorporated herein by reference. The source signature of the air gun array may then be used to design a designature operator on a shot by shot basis. In one implementation, the air gun array diagnostics, such as, the firing time of each air gun, the depth of each air gun and the like, are recorded for each shot. The source signature of the air gun array 14 may then be computed using the air gun array diagnostics and a source signature computer modeling program, as commonly known by ordinary persons skilled in the art.

With regards to the streamers 12, each streamer 12 includes a deflector 16 at a front portion and a tail buoy 20 at a rear portion. The deflector 16 is used to horizontally position the end of the streamer 12 nearest the seismic survey vessel 10 and the tail buoy 20 is used to create a drag at the end of the streamer 12 farthest from the seismic survey vessel 10. The tension created on the seismic streamer 12 by the deflector 16 and the tail buoy 20 results in the roughly linear shape of the seismic streamer 12 shown in FIG. 1.

A plurality of streamer positioning devices 18, known as birds, is positioned between the deflector 16 and the tail buoy 20. Preferably, the positioning devices 18 are both vertically and horizontal steerable. These positioning devices 18 may, for instance, be located at regular intervals along the streamer 12, such as every 200 to 400 meters. The vertically and horizontally positioning devices 18 can be used to constrain the shape of the seismic streamer 12 between the deflector 16 and the tail buoy 20 in both the vertical (depth) and horizontal directions. A control system for the positioning devices 18 is distributed between a global control system 22 located on or near the seismic survey vessel 10 and a local control system 36 (shown in FIG. 2) located within or near the positioning devices 18. The global control system 22 is typically connected to the seismic survey vessel's navigation system and obtains estimates of system wide parameters, such as the vessel's towing direction and velocity and current direction and velocity, from the vessel's navigation system.

The global control system 22 monitors the actual positions of each of the positioning devices 18 and is programmed with the desired positions of or the desired minimum separations between the seismic streamers 12. The horizontal positions of the positioning devices 18 can be derived, for instance, using the types of acoustic positioning systems described in commonly assigned U.S. Pat. No. 4,992,990, which is incorporated herein by reference. Alternatively, or additionally, a satellite-based global positioning system can be used to determine the positions of the equipment. The vertical positions of the positioning devices 18 are typically monitored using pressure sensors attached to the positioning devices 18, as discussed below.

The global control system 22 preferably maintains a dynamic model of each of the seismic streamers 12 and utilizes the desired and actual positions of the positioning devices 18 to regularly calculate updated desired vertical and horizontal forces the positioning devices 18 should impart on the seismic streamers 12 and to move them from their actual positions to their desired positions. The global control system 22 preferably calculates the desired vertical and horizontal forces based on the behavior of each streamer 12 and also takes into account the behavior of the complete streamer array. Due to the relatively low sample rate and time delay associated with the horizontal position determination system, the global control system 22 runs position predictor software to estimate the actual locations of each of the positioning devices 18. The global control system 22 also checks the data received from the vessel's navigation system. The global control system 22 will typically acquire the following parameters from the vessel's navigation system: vessel speed (m/s), vessel heading (degrees), current speed (m/s), current heading (degrees), and the location of each of the positioning devices 18 in the horizontal plane in a vessel fixed coordinate system. Current speed and heading can also be estimated based on the average forces acting on the streamers 12 by the positioning devices 18. The global control system 22 will preferably send the following values to the local bird controller: demanded vertical force, demanded horizontal force, towing velocity, and crosscurrent velocity.

Figure 2:
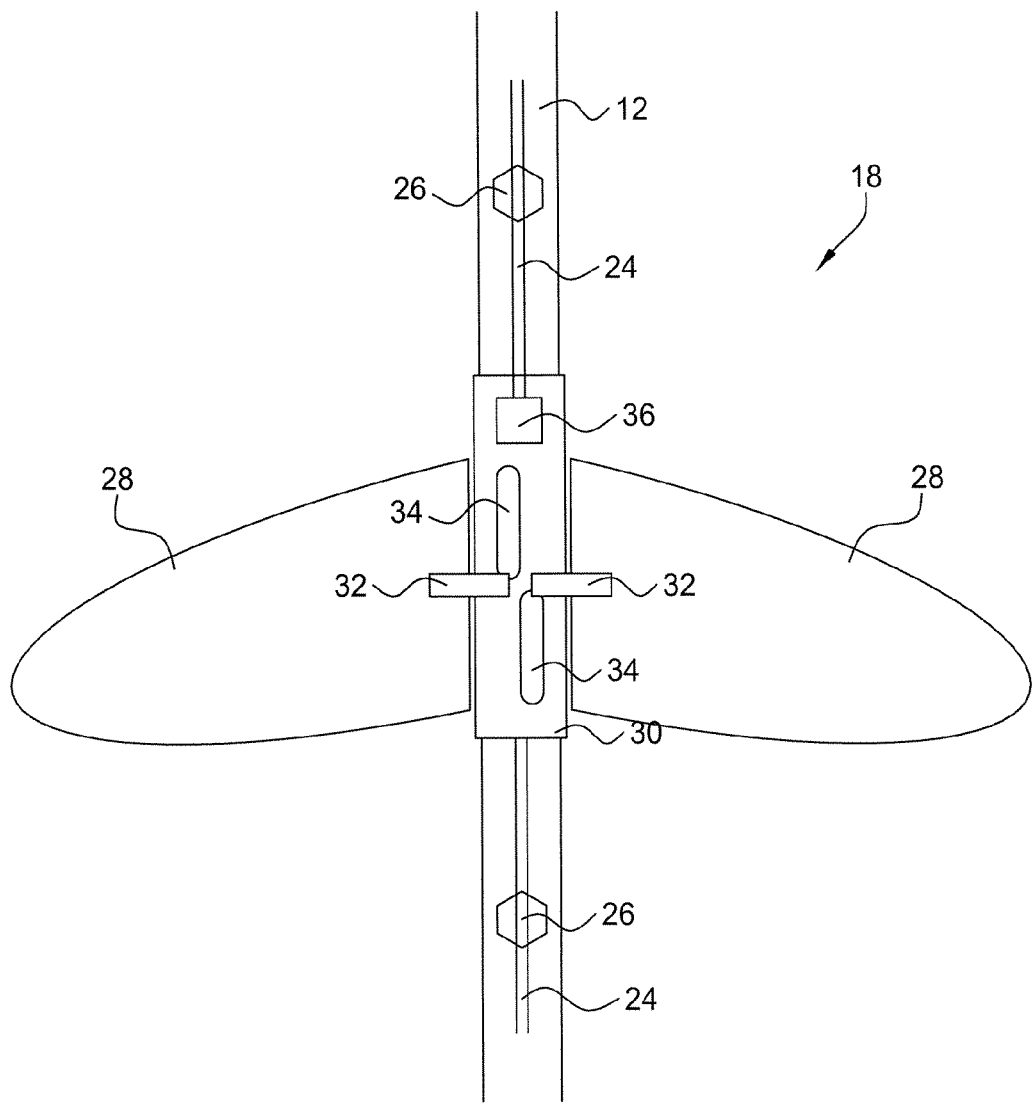
FIG. 2 illustrates a portion of the seismic streamer with an attached positioning device that may be used to acquire seismic data in accordance with one implementation of various technologies described herein.

FIG. 2 illustrates a portion of the seismic streamer 12 with an attached positioning device 18, which is capable of controlling the position of seismic streamer 12 in both the vertical and horizontal directions. The seismic streamer 12 further includes a communication line 24, which may consist of a bundle of fiber optic data transmission cables and power transmission wires. The communication line 24 passes along the length of the seismic streamer 12 and is connected to the seismic sensors (not shown), hydrophones 26, which are distributed along the length of the streamer 12, and to the positioning device 18. The positioning device 18 preferably has a pair of independently moveable wings 28, which are connected to rotatable shafts 32, which are rotatable by wing motors 34. The positioning device 18 allows the orientation of the wings 28 with respect to the positioning device body 30 to be changed.

The wing motors 34 may consist of any type of device that is capable of changing the orientation of the wings 28. The wing motors 34 may either be electric motors or hydraulic actuators. The local control system 36 controls the movement of the wings 28 by calculating a desired change in the angle of the wings 28 and selectively driving the motors 34 to effectuate this change.

One of the benefits of the above referenced control system is that the desired change in the orientation of the wing 28 is calculated using an estimate of the velocity of the positioning device 18 rather than simply relying on a feedback-loop type of control system that operates in the same manner regardless of the vessel speed. Because the force produced by wing 28 is proportional to the velocity of the device squared, a much more precise calculation of the desired change in the wing orientation can be made by using an estimate of the device velocity. As mentioned above, the global control system 22 shares responsibilities with the local control system 36. The global control system 22 is tasked with monitoring the positions of the streamers 12 and providing desired forces or desired position information to the local control system 36. The local control system 36 within each positioning device 18 is tasked with adjusting the wing splay angle to rotate the positioning device 18 to the proper position and for adjusting the wing common angle to produce the magnitude of total desired force required. The positioning devices 18, including the global control system 22 and the local control system 36 are described in more detail in commonly assigned GB/2,342,081, which is incorporated herein by reference. One or more implementations of various technologies described herein also contemplate other designs for the positioning devices 18, including those utilizing one full-moving wing with ailerons, three full-moving wings, four full-moving wings, and those described in commonly assigned U.S. Pat. No. 6,671,223, which is incorporated herein by reference.

With respect to the hydrophones 26, in one implementation, the hydrophones 26 may not be wired as to form groups that generate a single output. Rather, each hydrophone 26 is set to generate a separate output, which is subsequently filtered by an adaptive beamformer. The adaptive beamformer includes two or more spatially and/or temporally local multichannel adaptive filters with two or more channels. The adaptive beamformer is configured to discriminate its response in accordance with the spatial and/or temporal spectral content of the input signals. In this manner, filtered output signals can be generated and recorded for each hydrophone. The hydrophones 26 may be spaced at intervals of 3.125 meters to attenuate unwanted noise in the received seismic signals. The spacing between the hydrophones 26 may be based on a number of factors, such as available bandwidth for data transmission and recording or manufacturing costs. The spacing between the hydrophones 26 in combination with the adaptive beamformer are configured to reduce unwanted noise, particularly coherent noise, such as bulge wave noise, swell noise, and crossflow noise. The hydrophone configuration and the adaptive beamformer are described in more detail in commonly assigned U.S. Pat. No. 6,684,160, which is incorporated herein by reference.

Figure 3:
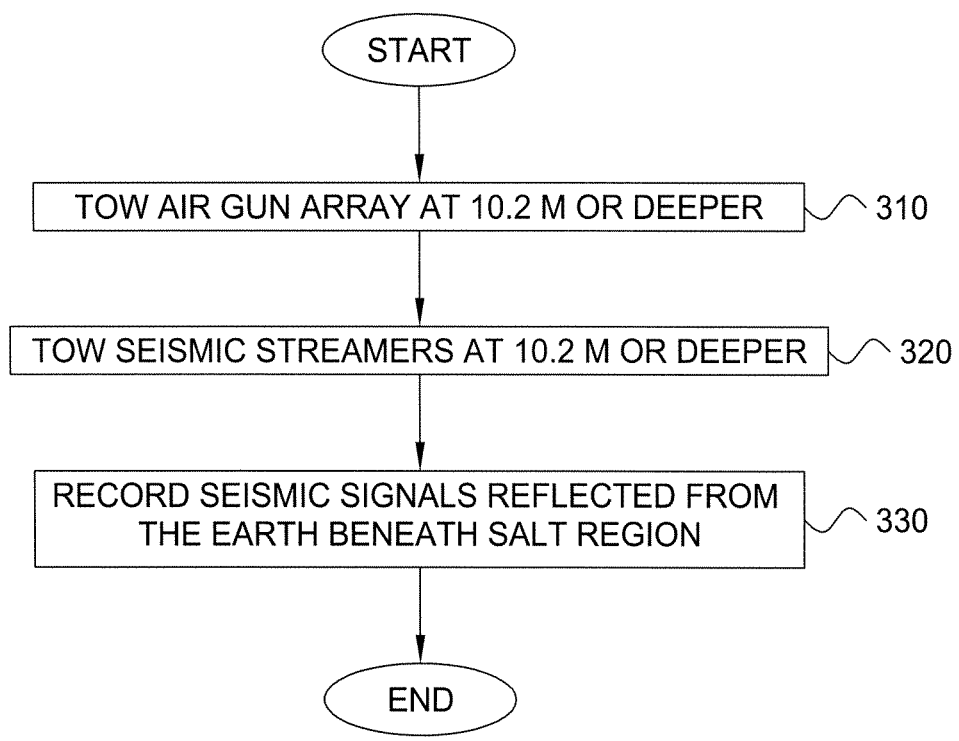
FIG. 3 illustrates a flow diagram of a method for enhancing the acquisition of low frequency seismic signals for sub-salt imaging in accordance with one implementation of various technologies described herein.

FIG. 3 illustrates a flow diagram of a method 300 for enhancing the acquisition of low frequency seismic signals for sub-salt imaging in accordance with one implementation of various technologies described herein. At step 310, the air gun array 14 is towed at 10.2 meters or deeper. In one implementation, the air gun array 14 may be towed between 10-25 meters deep. By placing the air gun array at such depths, the pass band of the source ghost response migrates to lower frequencies, thereby permitting the low frequency signal to be preserved. Accordingly, the depth of the air gun array 14 may be selected such that the pass zone of the ghost response coincides with a frequency range of the energy generated by the air gun array 14.

At step 320, the seismic streamers 12 are towed at 10.2 meters or deeper. In one implementation, the seismic streamers 12 may be towed between 10-25 meters deep. By placing the seismic streamers 12 at such depths, the pass band of the streamer ghost response migrates to lower frequencies, thereby permitting the low frequency signal to be preserved. Accordingly, the depth of the seismic streamers 12 may be selected such that the pass zone of the ghost response coincides with a frequency range of the energy generated by the air gun array 14.

At step 330, the seismic signals reflected from strata in the earth beneath the salt region are received by the hydrophones disposed on the seismic streamers 12. During acquisition, a low cut filter is often used to reduce swell noise contamination. However, the low cut filter also removes low frequency signals. In implementation, the seismic signals are recorded by the hydrophones without any low cut filters or with the low cut filter option turned off. In this manner, the amplitude of the low frequency signals may be enhanced.

Figure 4A:
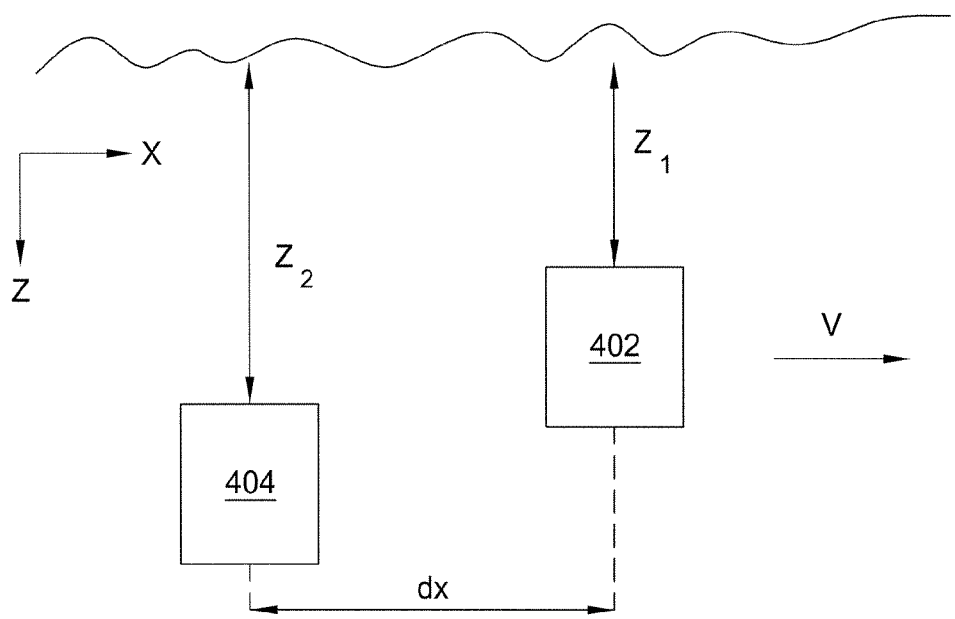
FIG. 4A illustrates a cross sectional view of an air gun array configuration in accordance with one implementation of various technologies described herein.

In accordance with one implementation of various technologies described herein, the seismic signals may be acquired using various air gun array and streamer configurations. FIG. 4A illustrates a cross sectional view of an air gun array configuration, which includes air gun arrays 402 and 404. Air gun array 402 is configured to enhance high frequency seismic signals, while air gun array 404 is configured to enhance low frequency seismic signals. Air gun array 402 is peak tuned, i.e., air gun array 402 is tuned to the leading peak, while air gun array 404 is bubble tuned, i.e., the air gun array 404 is tuned to the first bubble oscillation. In one implementation, air gun array 402 may be bubble tuned, while air gun array 404 may be peak tuned. The total volume of air gun array 404 is greater than the total volume of air gun array 402. For example, air gun array 402 has a total volume of 5085 cubic inches, whereas air gun array 404 has a total volume of 6780 cubic inches.

Air gun array 404 is disposed at a greater depth than air gun array 402. For example, air gun array 402 is disposed at a depth between about 6 to 8 meters, while air gun array 404 is disposed at a depth between about 14 to 18 meters. The difference in depth between air gun array 402 and air gun array 404 may be selected such that l/dt<fmax, where fmax is the maximum frequency in the seismic data. The time dt is determined by the depth difference between the two emitter arrays and by the velocity of seismic energy in water, which is a known quantity.

In addition to being separated in the vertical direction (z direction), the two air gun arrays are displaced by a horizontal distance dx in the horizontal direction (x direction). The horizontal displacement between the two emitter arrays is substantially equal to the shot point interval of the marine seismic surveying arrangement. As an example, for a seismic surveying arrangement that generates a shot point interval of 37.5 m, the horizontal displacement of the air gun arrays is approximately 37.5 m.

The two air gun arrays, however, are not displaced in the y direction, which extends out of the paper and perpendicular to the direction of movement of the air gun arrays. The seismic survey vessel 10 is configured to tow air gun arrays 402 and 404 at a speed V.

In use, the air gun arrays 402 and 404 are moved through the water in the direction along which the arrays are displaced. The air gun arrays 402 and 404 are fired in a "flip flop" sequence at equal shot point intervals, e.g., 37.5 m. The air guns on the array nearer the seismic survey vessel 10, i.e., air gun array 402, are fired initially. These air guns may be fired consecutively or simultaneously. After a time delay equal to the time required for the towing vessel to travel 37.5 m (i.e., dx/V), the air guns of the air gun array further from the seismic survey vessel 10, i.e., air gun array 404, are fired. The time delay dx/V between the firings of the two air gun arrays ensures that each air gun of one array is fired at the same x and y coordinates as the corresponding air gun of the other array, but at different depths. As such, two shot records are generated at points having the same x and y coordinates, but at different z coordinates (depths). In one implementation, the air gun arrays 402 and 404 are fired simultaneously using a source encoding technique such that each wavefield is encoded with a signature to indicate the air gun array to which the encoded wavefield is associated. Various encoding techniques are discussed in more detail in commonly assigned U.S. Pat. No. 5,924,049, which is incorporated herein by reference.

Figure 4B:
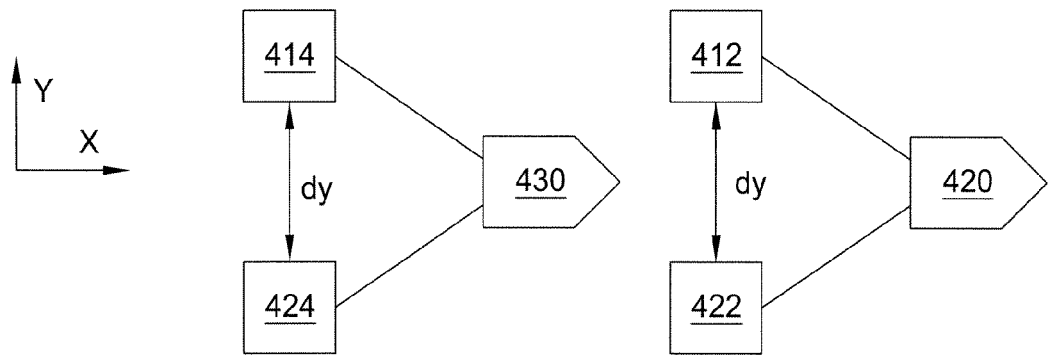
FIG. 4B illustrates a plan view of an air gun array configuration in accordance with one implementation of various technologies described herein.

FIG. 4B illustrates a plan view of an air gun array configuration, which includes air gun arrays 412, 422, 414 and 424. Air gun arrays 412 and 422 are towed by seismic survey vessel 420, while air gun arrays 414 and 424 are towed by seismic survey vessel 430. Seismic survey vessel 430 is shown as directly behind seismic survey vessel 420. Seismic survey vessel 430, however, may be positioned anywhere relative to seismic survey vessel 420. For instance, seismic survey vessel 430 may be placed beside seismic survey vessel 420. The two seismic survey vessels may be separated by a distance based on geophysical or survey design considerations, such as an offset range.

Air gun arrays 412 and 422 are configured to enhance high frequency seismic signals, while air gun arrays 414 and 424 are configured to enhance low frequency seismic signals. Air gun arrays 412 and 422 are peak tuned, while air gun arrays 414 and 424 are bubble tuned. In one implementation, air gun arrays 412 and 422 may be bubble tuned, while air gun arrays 414 and 424 may be peak tuned. The total volume of air gun arrays 414 and 424 are greater than the total volume of air gun arrays 412 and 422. For example, each one of air gun arrays 412 and 422 has a total volume of 5085 cubic inches, whereas each one of air gun arrays 414 and 424 has a total volume of 6780 cubic inches.

Air gun arrays 414 and 424 are disposed at a greater depth than air gun arrays 412 and 422. For example, air gun arrays 412 and 422 may be disposed at a depth of about 6 to 8 meters, while air gun arrays 414 and 424 may be disposed at a depth of about 14 to 18 meters.

Air gun arrays 412 and 422 are separated by a cross line distance dy in the y direction. The cross line distance dy between air gun arrays 412 and 422 depends on the separation between the streamers 12. Preferably, the cross line distance dy is half of the steamer separation. Air gun arrays 412 and 422, however, are not displaced in the x direction. Likewise, air gun arrays 414 and 424 are separated by the same cross line distance dy that separates air gun arrays 412 and 422, and are not displaced in the x direction.

In use, air gun arrays 412, 422, 414 and 424 are fired simultaneously using a source encoding technique such that each wavefield is encoded with a signature to indicate the air gun array with which the encoded wavefield is associated. As mentioned above, various encoding techniques are discussed in more detail in commonly assigned U.S. Pat. No. 5,924,049, which is incorporated herein by reference.

Figure 4C:
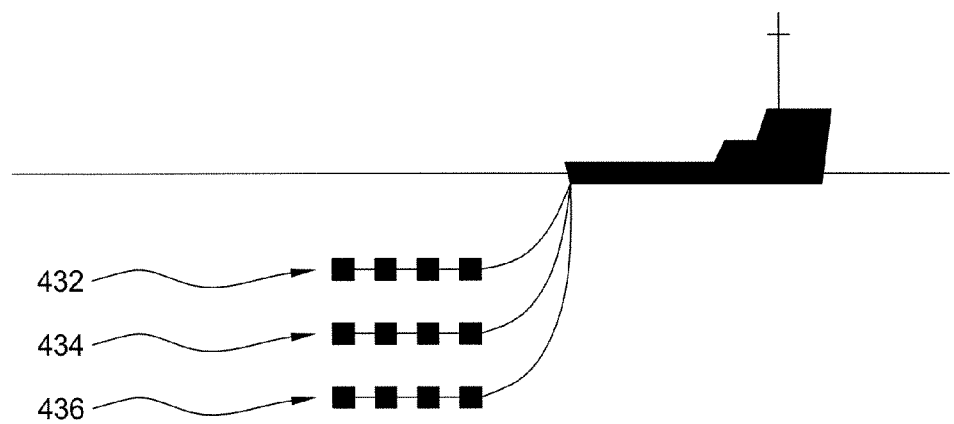
FIG. 4C illustrates a cross sectional view of an air gun array configuration in accordance with one implementation of various technologies described herein.

FIG. 4C illustrates a cross sectional view of an air gun array configuration, which includes air gun arrays 432, 434 and 436. Air gun arrays 432, 434 and 436 are disposed in the water at three different depths. Air gun array 432 is disposed substantially vertically above air gun array 434, while air gun array 434 is disposed substantially vertically above air gun array 436. In this manner, air gun arrays 432, 434 and 436 have the same x and y coordinates but different z coordinates. This arrangement may be referred to as an over/under combination of the air gun arrays. The term "over" is typically associated with the shallower air gun arrays and the term "under" is typically associated with the deeper air gun arrays. In use, air gun arrays 432, 434 and 436 may be fired in a "flip flop" sequence, or simultaneously using a source encoding technique such that each wavefield is encoded with a signature to indicate the particular air gun array to which the encoded wavefield is associated. Various encoding techniques are discussed in more detail in commonly assigned U.S. Pat. No. 5,924,049, which is incorporated herein by reference.

Figure 4D:
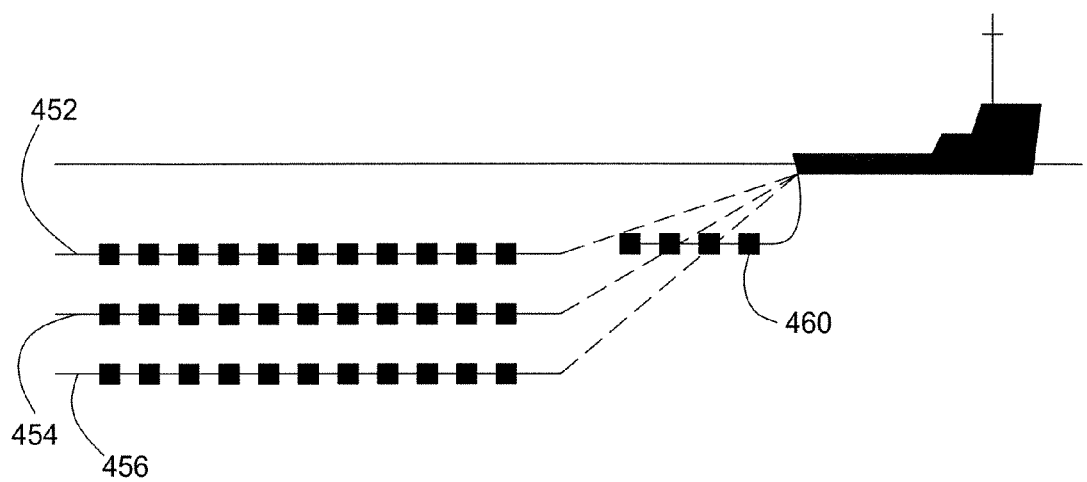
FIG. 4D illustrates a cross sectional view of a seismic streamer configuration in accordance with one implementation of various technologies described herein.

FIG. 4D illustrates a cross sectional view of a seismic streamer configuration, which includes seismic streamers 452, 454, 456 and air gun array 460. Seismic streamers 452, 454, 456 are disposed in the water at three different depths. Seismic streamer 452 is disposed substantially vertically above seismic streamer 454, while seismic streamer 454 is disposed substantially vertically above seismic streamer 456. In this manner, seismic streamers 452, 454 and 456 have the same x and y coordinates but different z coordinates. This arrangement may be referred to as an over/under combination of the seismic streamers. The term "over" is typically associated with the shallower seismic streamers and the term "under" is typically associated with the deeper seismic streamers. Although only one air gun array is shown to operate in connection with seismic streamers 452, 454 and 456, one or more implementations of various technologies described herein contemplate seismic streamers 452, 454 and 456 to operate with various air gun array configurations, such as those described with reference to FIGS. 4A, 4B and 4C.

Figure 5:
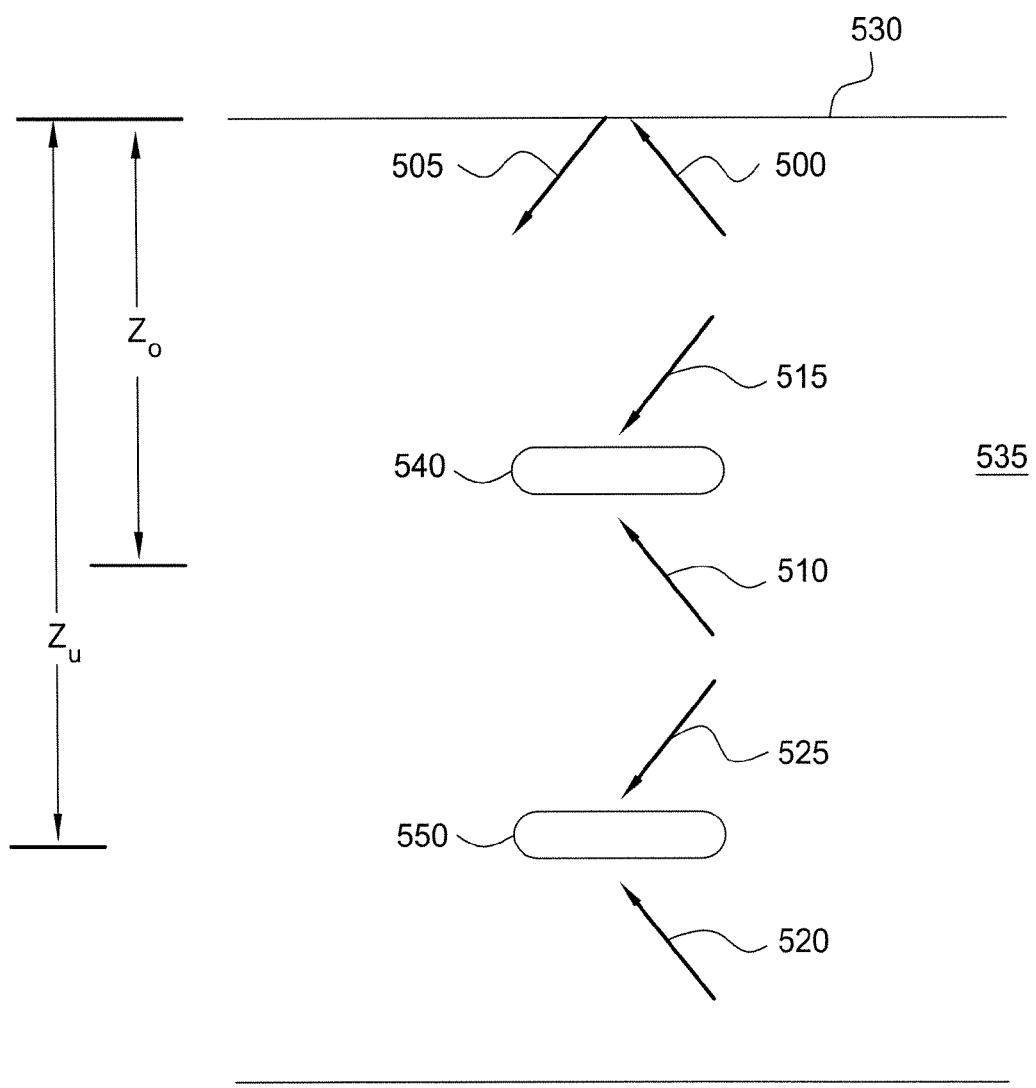
FIG. 5 illustrates up-going and down-going wave fields corresponding to at least one provided acoustic signal, or shot, in a marine seismic survey that may be used in connection with one implementation of various technologies described herein.

FIG. 5 illustrates up-going and down-going wave fields 500, 505, 510, 515, 520, 525 corresponding to at least one provided acoustic signal, or shot, in a marine seismic survey. Although the up-going and down-going wave fields are discussed as if they are separate entities, persons of ordinary skill in the art should appreciate that the up-going and down-going wave fields 500, 505, 510, 515, 520, 525 may represent portions of a single wave field produced by a single shot or portions of a plurality of wave fields produced by a plurality of shots.

An "over" seismic sensor 540 is deployed at a depth $Z_o$ beneath a surface 530 of a body of water 535 and an "under" seismic sensor 550 is deployed at a depth $Z_u$ beneath the surface 530. The "over" seismic sensor 540 detects one or more physical quantities indicative of the up-going and down-going wave fields 510, 515. In one implementation, the "over" seismic sensor 540 detects a pressure wave field $P(Z_o)$ at the location of the "over" seismic sensor 540. The "under" seismic sensor 550 detects one or more physical quantities indicative of the up-going and down-going wave fields 520, 525. In one implementation, the "under" seismic sensor 550 detects a pressure wave field $P(Z_u)$ at the location of the "under" seismic sensor 550.

The up-going wave field 520 at the "under" seismic sensor 550, represented by $U(Z_u)$, can be related to the pressure wave fields $P(Z_o)$ at the location of the "over" seismic sensor 540 and $P(Z_u)$ at the location of the "under" seismic sensor 550 by the expression:

$$U(Z_u) = \frac{W_D P(Z_u) - P(Z_o)}{W_D - W_U},$$

where $W_D$ and $W_U$ are wave field extrapolator operators for the down-going and up-going wave fields, respectively. Similarly, the down-going wave field 525 at the "under" seismic sensor 550, represented by $D(Z_u)$, can be related to the pressure wave fields $P(Z_o)$ and $P(Z_u)$ by the expression:

$$D(Z_u) = \frac{P(Z_o) - W_U P(Z_u)}{W_D - W_U}.$$

In one implementation, the wave field extrapolator operator $W_U$ is given by the expression:

$$W_U = e^{-j2\pi f \sqrt{1-k^2 v^2/f^2}(Z_o - Z_u)}$$

and the wave field extrapolator operator $W_D$ is given by the expression:

$$W_D = e^{-j2\pi f \sqrt{1-k^2 v^2/f^2}(Z_u - Z_o)}$$

where v is the water velocity, f is the wave frequency, and k is the wave number. Persons of ordinary skill in the art should appreciate that the expression for the wave field extrapolator operator $W_u$ is only valid for non-evanescent waves, i.e. $1-k^2 v^2/f^2 > 0$. Persons of ordinary skill in the art should also appreciate that similar expressions may be derived to relate the up-going and down-going wave fields 510, 515 at the "over" seismic sensor 540 to the pressure wave fields $P(Z_o)$ and $P(Z_u)$.

The up-going wave field 500 just beneath the surface 530 is given by the expression:

$$U(0) = U(Z_u) e^{-j2\pi f \sqrt{1-k^2 v^2/f^2}(Z_u)}$$

and the down-going wave field 505 just beneath the surface 530 is given by the expression:

$$D(0) = D(Z_u) e^{j2\pi f \sqrt{1-k^2 v^2/f^2}(Z_u)}$$

The above expressions for the up-going and down-going wave fields 500, 505 assume that the surface 530 is at Z=0.

If the surface 530 is assumed to be perfectly calm, a circumstance that is virtually never achieved in practice, then the up-going and the down-going wave fields 500, 505 at the surface 530 are equal in absolute value and have opposite signs. In mathematical terms, the surface 530 is considered a free surface at which a pressure wave field vanishes, i.e. P(Z=0)=0, so that the up-going and down-going wave fields 500, 505 are related by a flat sea boundary condition:

$$P(Z=0) = U(0) + D(0) = 0$$

By imposing the flat sea boundary condition in the form U(0)=−D(0), i.e. a surface reflectivity of −1, for a data window below a direct arrival, the following expression may be derived:

$$P(Z_o)[e^{j2\pi f \sqrt{1-k^2 v^2/f^2} Z_u}(1-e^{-j2\pi f \sqrt{1-k^2 v^2/f^2}(Z_u)})] = P(Z_u)[e^{j2\pi f \sqrt{1-k^2 v^2/f^2} Z_o}(1-e^{-j2\pi f \sqrt{1-k^2 v^2/f^2}(Z_o)})].$$

Persons of ordinary skill in the art should appreciate that the expressions in brackets are ghost operators, $F_O$ and $F_U$, for the over and under seismic data, respectively, in the case of a perfectly calm surface 530. Accordingly, the above expression states that the pressure at the "over" seismic receiver 540 multiplied by the ghost operator $F_U$ of the "under" seismic receiver 550 is equal to the pressure at the "under" seismic receiver 550 multiplied by the ghost operator $F_O$ of the "over" seismic receiver 540. In mathematical terms, the above expression may be written in the simplified form: $P(Z_o) F_O = P(Z_u) F_U$.

However, as discussed above, the surface 530 is virtually never flat, as assumed above and in conventional practice. Moreover, the above expressions do not account for temporal and spatial variations in the water velocity, reflectivity of the surface 530, streamer positioning errors, and other non-ideal conditions that are frequently encountered in real marine seismic surveys. To account, at least in part, for the effects of the aforementioned non-ideal conditions, one or more calibration filters are determined in a manner that will be discussed in detail below. The calibration filters are then used to form an over/under combination of marine seismic data acquired by the "over" seismic receiver 540 and the "under" seismic receiver 550. For example, the over/under combination may be formed by modifying the surface boundary condition using the one or more calibration filters. The over/under combination formed with the modified boundary condition may result in a combined data set with reduced noise relative to a data set formed by an over/under combination using the flat sea boundary condition.

Figure 6:
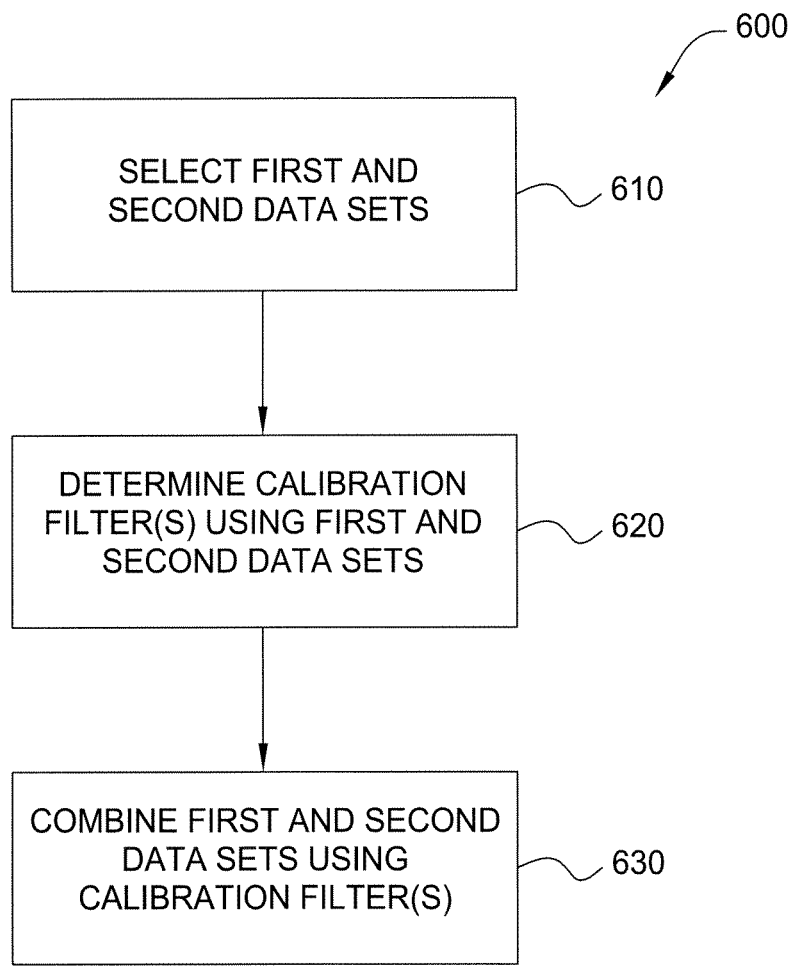
FIG. 6 illustrates a flow diagram of a method for forming an over/under combination using one or more calibration filters that may be used in connection with one implementation of various technologies described herein.

FIG. 6 illustrates a flow diagram of a method 600 for forming an over/under combination using one or more calibration filters in accordance with one implementation of various technologies described herein. First and second data sets are selected (at 610). In one implementation, the first and second data sets are selected (at 610) to be pre-stack over and under data sets acquired by at least one seismic sensor coupled to an "over" streamer and at least one seismic sensor coupled to an "under" streamer in an over/under streamer combination. However, various technologies described herein are not limited to selecting (at 610) all of the data in the pre-stack data set. In one alternative implementation, portions of the pre-stacked data set acquired within a selected time window and/or a selected offset may be selected (at 610). In another alternative implementation, portions of the pre-stacked data set from a selected gather, such as a shot gather and/or a receiver gather, may be selected (at 610).

The first and/or second data sets may be provided via transmission over a wired and/or wireless medium. For instance, the over and under data sets may be selected from the data as it is gathered, or shortly after it is collected, from a seismic survey. Alternatively, the first and/or second data sets may be recorded on and transmitted via recording tape, magnetic disks, compact disks, DVDs, and the like. Thus, the first and second data sets can, in some implementations, can be selected from data previously collected and archived on some magnetic or optical storage medium.

One or more calibration filters are determined (at 620) using the selected over and under data sets. In one implementation, the one or more calibration filters are determined (at 620) by initially assuming, as discussed above, the pressure at the "over" seismic receiver 440 multiplied by the ghost operator $F_U$ of the "under" seismic receiver 450 is equal to the pressure at the "under" seismic receiver 450 multiplied by the ghost operator $F_O$ of the "over" seismic receiver 440, i.e. $P(Z_o)F_O = P(Z_u)F_U$. This technique is often referred to as across-ghosting technique.

However, as discussed above, this relationship generally is not precise for the acquired over/under seismic data. The one or more calibration filters, a(f), may therefore be determined using the expression $a(f)P(Z_o)F_O = P(Z_u)F_U$. For example, the one or more calibration filters may be determined by evaluating the expression $a(f)P(Z_o)F_O = P(Z_u)F_U$ by a least-squares criterion. However, persons of ordinary skill in the art should appreciate that various implementations described herein are not limited to applying the least-squares criterion to the expression $a(f)P(Z_o)F_O = P(Z_u)F_U$. Further, any desirable expression may be evaluated with any desirable technique used to determine the calibration filters. Persons of ordinary skill in the art should also appreciate that the one or more calibration filters may be determined such that the expression $a(f)P(Z_o)F_O = P(Z_u)F_U$ holds true in a statistical sense, even though it may not hold precisely for all the acquired seismic data used to determine the calibration filters.

The one more calibration filters are then used to combine (at 630) the first and second data sets to form a third data set, such as an over/under combined data set. The one or more calibration filters may be used to define a perturbed boundary condition using over and under data sets. The perturbed boundary condition is then incorporated into a selected over/under combination technique that is used to combine (at 630) the over and under seismic data. Persons of ordinary skill in the art should appreciate that various implementations described herein are not limited to any particular technique for combining (at 630) the over and under seismic data using the one or more calibration filters. In various alternative implementations, any desirable technique for combining (at 630) the over and under seismic data using the one or more calibration filters may be used.

While the foregoing is directed to various implementations described herein, other and further implementations may be devised without departing from the basic scope thereof, and the scope thereof is determined by the claims that follow.

The invention claimed is:

1. A method for acquiring seismic data, comprising:
towing one or more seismic streamers in the water;
towing a first air gun array and a second air gun array in the water at a first depth, wherein the first and second air gun arrays are separated by a cross line distance that depends on a separation between the seismic streamers;
towing a third air gun array and a fourth air gun array in the water at a second depth greater than the first depth, wherein the third and fourth air gun arrays are separated by the cross line distance that depends on the separation between the seismic streamers;
firing seismic energy, by the first, second, third and fourth air gun arrays, through the water into the earth; and
recording seismic signals reflected from strata in the earth beneath the water.

2. The method of claim 1, wherein the first and second air gun arrays are tuned to a leading peak and the third and fourth air gun arrays are tuned to a first bubble oscillation.

3. The method of claim 1, wherein each one of the first and second air gun arrays has a total volume less than the total volume of each one of the third and fourth air gun arrays.

4. The method of claim 1, wherein the total volume of each one of the first and second air gun arrays is about 5085 cubic inches and the total volume of each one of the third and fourth air gun arrays is about 6780 cubic inches.

5. The method of claim 1, wherein the first depth ranges from about 6 to about 8 meters and the second depth ranges from about 14 to about 18 meters.

6. The method of claim 1, wherein firing the first, second, third and fourth air gun arrays comprises firing the first, second, third and fourth air gun arrays simultaneously to generate a plurality of wavefields, wherein each wavefield is encoded with a signature indicating the air gun array with which the wavefield is associated.

7. The method of claim 1, wherein the first and second arrays are configured to enhance high frequency seismic energy.

8. The method of claim 1, wherein the third and fourth arrays are configured to enhance low frequency seismic energy.

9. The method of claim 1, wherein the first and second air gun arrays are towed by a first vessel and the third and fourth air gun arrays are towed by a second vessel.

10. The method of claim 1, wherein the cross line distance is half of the separation between the seismic streamers.

11. A marine surveying arrangement, comprising:
one or more streamers having a separation therebetween;
a first vessel deploying a first air gun array and a second air gun array separated by a cross line distance defined by the separation between the streamers, wherein the first and second air gun arrays are tuned to a leading peak, wherein each one of the first and second air gun arrays has a first total volume; and
a second vessel deploying a third gun array and a fourth air gun array separated by the cross line distance, wherein the third and fourth air gun arrays are tuned to a first bubble oscillation, wherein each one of the third and fourth air gun arrays has a second total volume greater than the first total volume.

12. The marine surveying arrangement of claim 11, wherein the cross line distance is half of the separation between the seismic streamers.

13. The marine surveying arrangement of claim 11, wherein the first total volume is about 5085 cubic inches and the second total volume is about 6780 cubic inches.

14. The marine surveying arrangement of claim 11, wherein:
   the first and second arrays are at a first depth from about 6 to about 8 meters; and
   the third and fourth arrays are at a second depth from about 14 to about 18 meters.

15. The marine surveying arrangement of claim 11, wherein the first, second, third and fourth air gun arrays are fired simultaneously to generate a plurality of wavefields, wherein each wavefield is encoded with a signature indicating the air gun array with which the wavefield is associated.

16. The marine surveying arrangement of claim 11, wherein:
   the first and second arrays are configured to enhance high frequency seismic energy; and
   the third and fourth arrays are configured to enhance low frequency seismic energy.

17. The marine surveying arrangement of claim 11, wherein the first, second, third and fourth air gun arrays are fired in a "flip flop" sequence.

* * * * *